(12) United States Patent
Jeon et al.

(10) Patent No.: US 10,235,609 B1
(45) Date of Patent: Mar. 19, 2019

(54) MODIFIED CONNECTOR FOR ACCEPTING MULTIPLE FORMS OF DATA STORAGE CARDS

(71) Applicant: MOTOROLA MOBILITY LLC, Chicago, IL (US)

(72) Inventors: Myongjin Jeon, Buffalo Grove, IL (US); Brandon Myounghwan Lee, Northbrook, IL (US); Hyo Chang Kim, Northbrook, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/824,261

(22) Filed: Nov. 28, 2017

(51) Int. Cl.
*G06K 7/00* (2006.01)
*G06K 13/08* (2006.01)
*H04B 1/3818* (2015.01)

(52) U.S. Cl.
CPC ....... *G06K 13/0831* (2013.01); *G06K 7/0021* (2013.01); *H04B 1/3818* (2015.01); *G11B 2220/17* (2013.01)

(58) Field of Classification Search
CPC ............. G06K 13/0831; G06K 7/0021; H04B 1/3818; G11B 2220/17
See application file for complete search history.

(56) References Cited

U.S. PATENT DOCUMENTS

| | | | | |
|---|---|---|---|---|
| 7,106,597 B2* | 9/2006 | Kao | ....................... | H02G 11/00 191/12 R |
| 7,204,718 B2* | 4/2007 | Lai | ........................ | H01R 27/00 439/630 |
| 8,568,174 B2* | 10/2013 | Liu | ........................ | H01R 27/02 439/630 |
| 9,246,249 B2* | 1/2016 | Lee | ..................... | G06K 7/0056 |
| 9,998,164 B2* | 6/2018 | Wu | ..................... | H04B 1/3818 |
| 2012/0276765 A1* | 11/2012 | Nakase | .................. | H04M 1/026 439/159 |
| 2013/0196523 A1* | 8/2013 | Lim | ..................... | G06K 7/0021 439/153 |
| 2016/0359269 A1* | 12/2016 | Motohashi | .......... | G06K 7/0021 |
| 2018/0109032 A1* | 4/2018 | Chen | .................... | G06K 7/0021 |
| 2018/0316377 A1* | 11/2018 | Yang | ....................... | G06K 7/00 |

* cited by examiner

*Primary Examiner* — Seung H Lee
(74) *Attorney, Agent, or Firm* — Yudell Isidore PLLC

(57) ABSTRACT

A connector component for use in an electronic device for concurrently accepting multiple forms of data storage cards. The connector component comprises a housing shell, a housing shell support, a plurality of contacts, and a tray. The housing shell support includes a flexible bilateral surface with a first side that is coupled to the housing shell. In response to a force from an inserted data storage card, the housing shell support temporarily recoils, thereby decreasing an area between the housing shell and the housing shell support. The plurality of contacts is coupled to an exposed surface of the housing shell support. The plurality of contacts interconnects with a corresponding electrical contact on each inserted data storage card for electronically transferring electronic data. The tray has a capacity to hold at least three different forms of data storage cards for a concurrent insertion into a cavity of the connector component.

20 Claims, 8 Drawing Sheets

MODIFIED CONNECTOR FOR ACCEPTING MULTIPLE FORMS OF DATA STORAGE CARDS

BACKGROUND

1. Technical Field

The present disclosure generally relates to connector components utilized in electronic devices, such as mobile communication devices, and in particular to a modified connector component and method for accepting multiple forms of data storage cards in an electronic device.

2. Description of the Related Art

Mobile communication devices are typically equipped with a Subscriber Identity Module (SIM) card that is programmed to store user identification information. When a SIM card is inserted into and/or communicatively connected with the mobile communication device, the processing system of the mobile communication device is immediately able to recognize the user identification information that is stored in the SIM card. Additionally, the SIM card can provide information regarding the kind of transmission services and data gathering services that are supported. SIM connectors are needed to appropriately read a SIM card. Most mobile communication devices are configured to have a built-in SIM connector that can be accessed from a perimeter edge of the device by the user.

As mobile devices encompass more technology and technological components, the components compete for available space within the component layout of the device. The current space requirements and orientation for SIM connectors provide a challenge when configuring the layout of the components, as the SIM connectors tend to be long, occupying much needed space that can be otherwise utilized for other functional components. Furthermore, current connectors are not conducive to the simultaneous insertion and use of multiple data storage cards that have multiple shapes and different purposes.

BRIEF DESCRIPTION OF THE DRAWINGS

The description of the illustrative embodiments is to be read in conjunction with the accompanying drawings. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
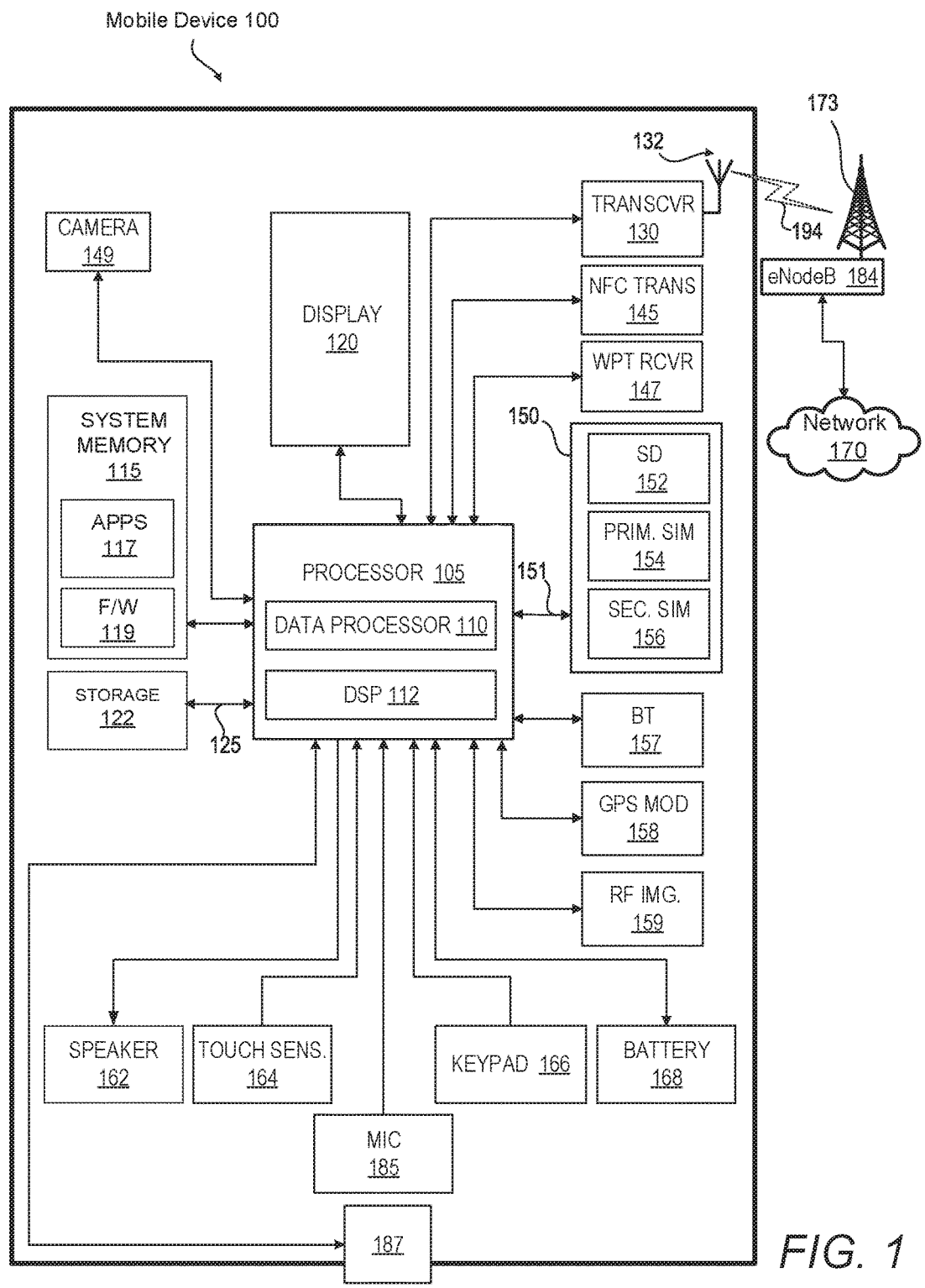
FIG. 1 illustrates a mobile communication device within which certain aspects of the disclosure can be practiced, in accordance with one or more embodiments.

Disclosed are a connector component, an electronic device configured with the connector component, and a method for manufacturing the connector component. The connector component concurrently accepts multiple forms of data storage cards within the electronic device. According to one embodiment, the electronic device comprises a processor, a system interconnect coupled to the processor, and an input/output controller coupled to the system interconnect and to a connector component. The connector component comprises a housing shell, a housing shell support, a plurality of electrical contacts, and a tray for enabling insertion of one or more data storage cards. The housing shell support includes a flexible bilateral surface with a first side that is coupled to the housing shell using an adhesive layer. In response to a force from each inserted data storage card, the housing shell support temporarily recoils, decreasing an area between the housing shell and the housing shell support. The plurality of contacts connects to corresponding electrical contacts on an inserted data storage card. The plurality of contacts is coupled to an exposed surface of the housing shell support, and are positioned to contact the electrical contacts of each inserted data storage card and respectively form an electrical connection with each inserted data storage card. The tray inserts into a cavity of the housing shell. The tray has a dimensional capacity to concurrently hold at least three different forms of data storage cards. Select areas of the perimeter edge of the housing shell are welded together to form an enclosed area with an opening for receiving the tray.

According to another embodiment, the connector comprises a housing shell, a housing shell support, a plurality of contacts, and a tray. The housing shell support has a flexible bilateral surface with a first side that is coupled to the housing shell using an adhesive layer. In response to a force from an inserted data storage card, the housing shell support temporarily recoils, decreasing an area between the housing shell and the housing shell support. The plurality of contacts coupled to an exposed surface of the housing shell support interconnects with a corresponding electrical contact on each inserted data storage card for electronically transferring electronic data. The tray has a capacity to hold at least three different forms of data storage cards for a concurrent insertion into a cavity of the connector. The cavity is formed by the housing shell.

In yet another embodiment, the method includes centrally aligning at least one corresponding perforation of a housing shell, a housing shell support, and a bilateral adhesive flexible layer to form, in part, a housing structure for a connector component. The method further includes coupling the housing shell to the housing shell support by activating an adhesive property of the bilateral adhesive flexible layer. The method also includes selectively connecting a plurality of contacts to an exposed surface of the housing shell support. The method further includes welding select perimeter edges of the housing shell together to form an enclosed area with an opening for receiving a data storage card tray. The data storage card tray holds a plurality of data storage cards, and each of the plurality of contacts are accessible to connect to a corresponding electrical contact on an inserted data storage card from among the plurality of data storage cards.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "alternate embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within the presented devices are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1 illustrates a block diagram representation of an example electronic device, presented as mobile device 100, within which one or more of the described features of the various embodiments of the disclosure can be implemented. While described herein as a mobile device, it is appreciated that an electronic device may be a handheld device, personal computer, a server, a network storage device, or any other device suitable for receiving a data storage card and may vary in size, shape, performance, functionality, and price. The presentation of the electronic device as mobile device 100 is therefore not to be taken as limiting on the disclosure.

Referring specifically to FIG. 1, example mobile device 100 includes at least one processor integrated circuit, generally referenced as processor 105. Included within processor 105 are data processor 110 and digital signal processor (DSP) 112. Processor 105 is coupled to system memory 115 and non-volatile storage 122 via a system communication mechanism, such as system interconnect 125. System interconnect 125 can be interchangeably referred to as a system bus, in one or more embodiments. One or more software and/or firmware modules can be loaded into system memory 115 during operation of mobile device 100. Specifically, in one embodiment, system memory 115 can include therein a plurality of such modules, including applications 117 and firmware (F/W) 119. System memory 115 may also include basic input/output system and an operating system (not shown). The software and/or firmware modules provide varying functionality when their corresponding program code is executed by processor 105 or by secondary processing devices within mobile device 100.

Processor 105 supports connection by and processing of signals from one or more connected input devices such as touch sensor 164, microphone 185, and keypad 166. Processor 105 also supports connection by and processing of signals from other connected input devices such as camera 149, touch screen display 120, and connector 150. Additionally, processor 105 supports connection by and processing of signals for connected output devices such as speaker 162. Touch screen display 120 can operate as both an input and an output device when touch screen display 120 is configured with a touch screen interface. Connector 150 includes a plurality of contacts, for example, non-volatile memory card contact 152, primary Subscriber Identity Module (SIM) card contact 154, and secondary SIM card contact 156. Connector 150 transmits signals to processor 105 via interface 151 such as a board-to-board contact, which enables the transmission of signals between printed circuit boards (PCBs). In one or more embodiments, one or more device interfaces 187 for connection to one or more devices, such as an optical reader, an universal serial bus (USB), a card reader, Personal Computer Memory Card International Association (PCMIA) slot, and/or a high-definition multimedia interface (HDMI), can be associated with mobile device 100. Mobile device 100 also contains a power source such as a battery 168 that supplies power to mobile device 100.

Mobile device 100 further includes Bluetooth transceiver 157, global positioning system module (GPS MOD) 158, and radio frequency imaging sensor 159, which are communicatively coupled to processor 105. Bluetooth transceiver 157 enables mobile device 100 and/or components within mobile device 100 to communicate and/or interface with other devices, services, and components that are located external to mobile device 100. GPS MOD 158 enables mobile device 100 to communicate and/or interface with other devices, services, and components to send and/or receive geographic position information. Radio frequency imager sensor 159 utilizes electromagnetic fields to automatically identify and track corresponding tags attached to objects, for example radio frequency identification tags, one-dimensional barcode tags, two-dimensional barcode tags, etc.

Mobile device 100 is presented as a wireless communication device. As a wireless device, mobile device 100 can transmit data over wireless network 170. Mobile device 100 includes transceiver 130, which is communicatively coupled to processor 105 and to antenna 132. Transceiver 130 allows for wide-area or local wireless communication, via wireless signal 194, between mobile device 100 and evolved node B (eNodeB) 184, respectively utilizing antenna 132 and antenna 173. Mobile device 100 is capable of wide-area or local wireless communication with other mobile wireless devices or with eNodeB 184 as a part of a wireless communication network. Mobile device 100 communicates with other mobile wireless devices by utilizing a communication path involving transceiver 130, antenna 132, antenna 173, and eNodeB 184. Mobile device 100 additionally includes near field communication transceiver (NFC TRANS) 145 and wireless power transfer receiver (WPT RCVR) 147. In one embodiment, other devices within mobile device 100 utilize antenna 132 to send and/or receive signals in the form of radio waves. For example, GPS module 158 can be communicatively couple to antenna 132 to send/and receive location data.

As provided by FIG. 1, mobile device 100 includes connector 150 which receives a plurality of data storage cards and enables processor 105 to selectively process data received from each data storage card. Additional aspects of connector 150, and functionality thereof, are presented within the description of FIGS. 3-10.

Figure 2B:
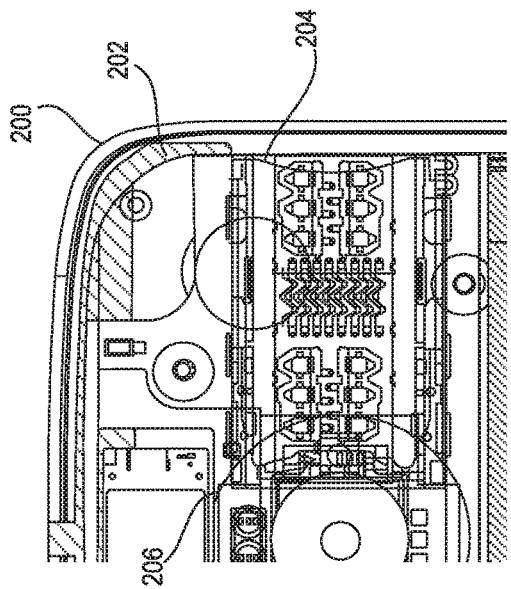
FIG. 2B illustrates a horizontally placed SIM connector, in accordance with theoretical use of an existing SIM connector in a mobile device.
Figure 2A:
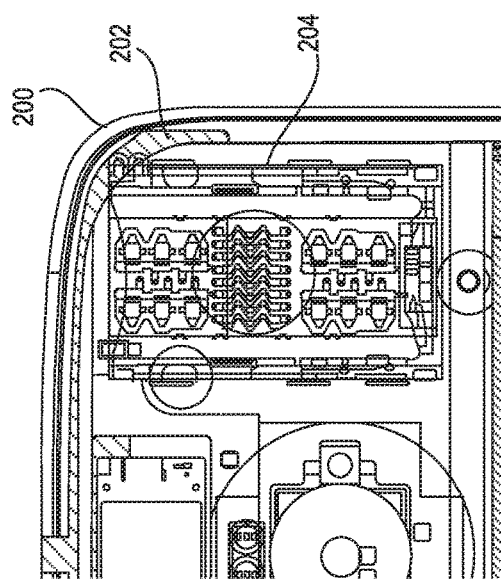
FIG. 2A illustrates a vertically placed Subscriber Identity Module (SIM) connector, in accordance with prior use of a SIM connector in a mobile device.

FIG. 2A is a partial illustration of an example mobile device 200, which includes top antenna 202 and SIM connector assembly 204. SIM connector assembly 204 is a connector and tray utilized to receive a SIM card. In this example, SIM connector assembly 204 is positioned to be vertically oriented relative to the x-axis and extends towards the top of mobile device 200 within which top antenna 202 is located. In this orientation, SIM connector assembly 204 physically intersects with top antenna 202, and thereby interferes with the reception/transmission of signals to/from a transceiver associated with top antenna 202.

FIG. 2B is a partial illustration of an example mobile device 200, which includes top antenna 202, SIM connector assembly 204, and, in theory, would include radio frequency imaging sensor 206. In FIG. 2B, SIM connector assembly 204 is horizontally placed in mobile device 200, in accordance with theoretical use of an existing SIM connector in a mobile device. Specifically, SIM connector assembly 204 is placed in a position where the long side of SIM connector assembly 204 is placed horizontal to the x-axis. In this orientation, SIM connector assembly 204 would physically intersect radio frequency imager sensor 206. Thus, the length of the horizontally-oriented conventional SIM connector assembly does not leave useable space for including radio frequency imaging components, such as radio frequency imaging sensor 206 in the same device. Therefore, mobile device 200 could not be equipped with a radio frequency (RF) imager such as radio frequency imaging sensor 206 and a conventional SIM connector, such as SIM connector assembly 204.

The present disclosure, which includes features illustrated by the following figures, provide a modified connector for use in mobile devices that are also equipped with radio frequency imaging sensors.

Figure 3:
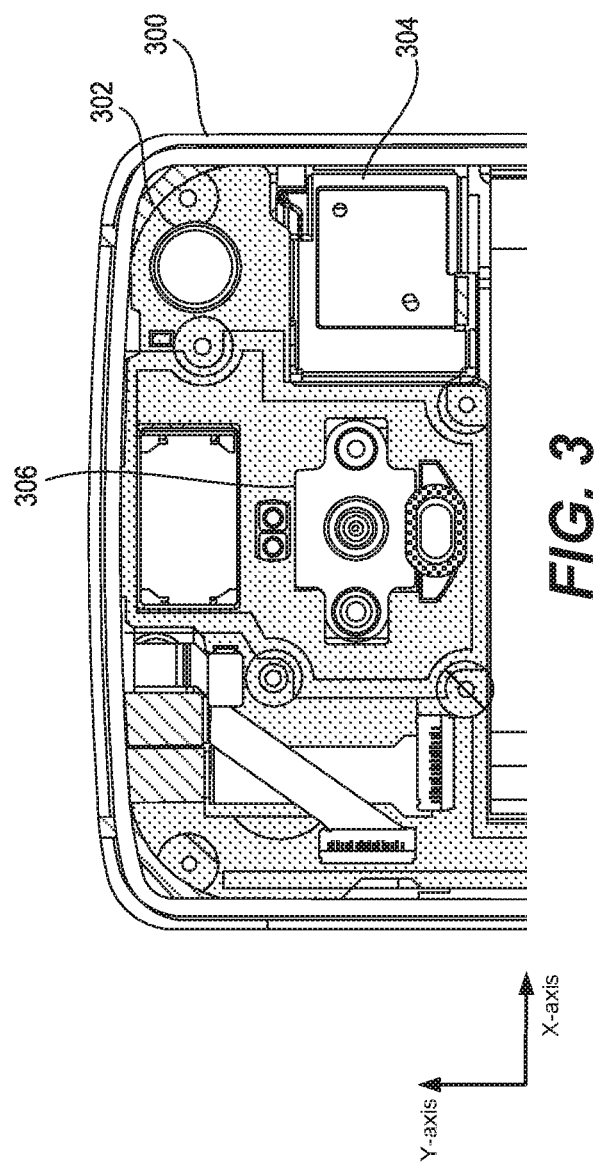
FIG. 3 illustrates an example of a modified connector component that is positioned in a mobile communication device, in accordance with one or more embodiments.

In the description of the following figures, reference is also occasionally made to specific components illustrated within the preceding figures, specifically FIG. 1, utilizing the same reference numbers from the earlier figures. With reference now to FIG. 3, there is depicted a partial view of an example mobile device component layout. Mobile device 300 includes top antenna 302, modified connector component 304, and radio frequency imaging sensor 306. Modified connector component 304 is presented in an external, top down view. The longest facet of modified connector component 304 is positioned lateral to a side of mobile device 300. According to one aspect of the disclosure, the longest facet of modified connector component 304 is shorter in length along the x-axis than conventional SIM connector assembly 204 (FIG. 2); This reduction in the length of the modified connector component 304 relative to the conventional connector assembly 204 allows for adequate space for placement of radio frequency imaging sensor 306 into the component layout of mobile device 300. Additionally, as another aspect of the disclosure, modified connector component 304 has the capacity to hold at least three different forms of data storage cards and supports concurrent insertion of these three different forms of data storage cards into the cavity of modified connector component 304.

Figure 4:
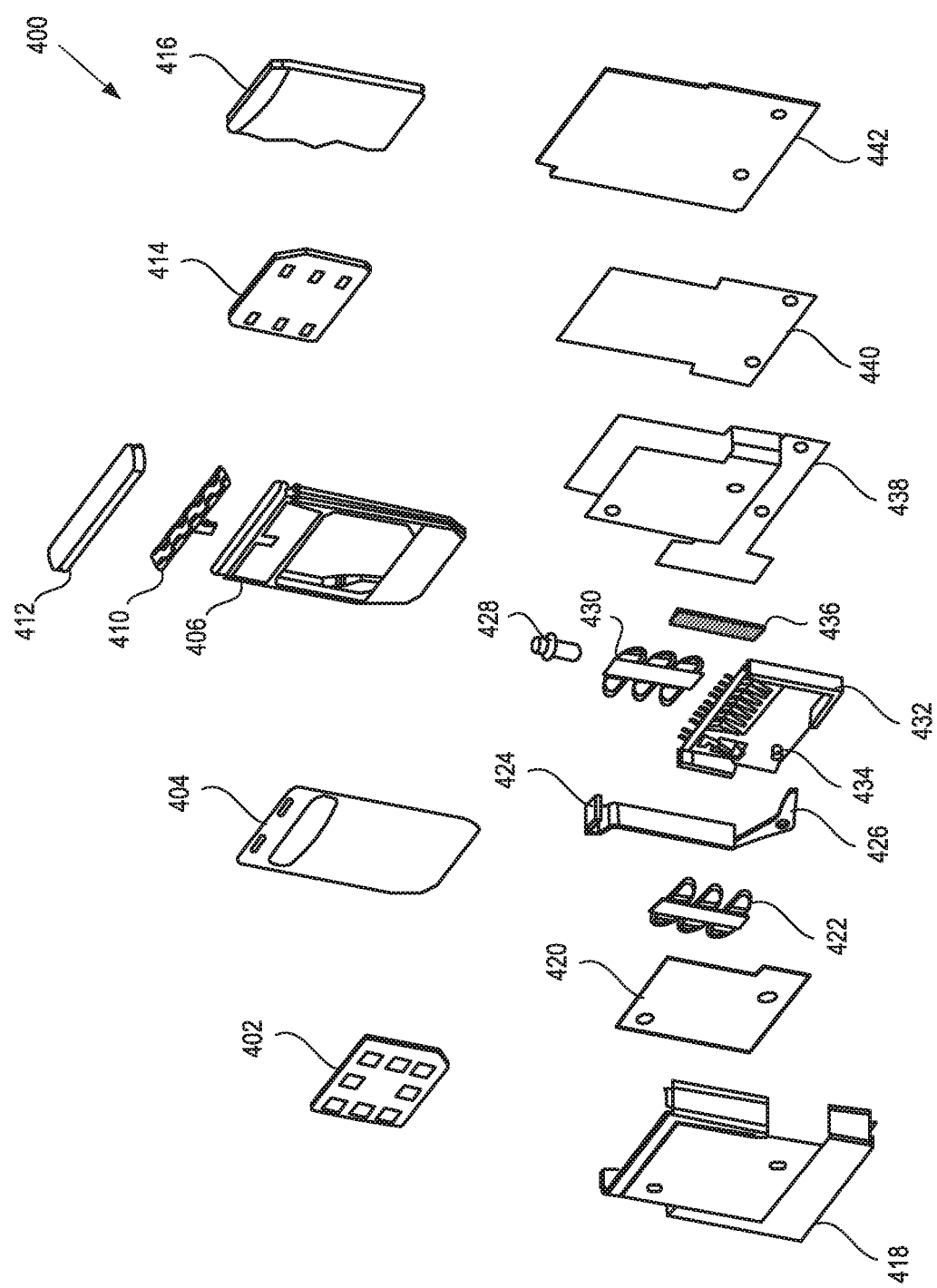
FIG. 4 illustrates an example of select parts used to configure the modified connector component, according to one or more embodiments.

Turning now to FIG. 4, there is presented an exploded view of the example modified connector component 304 with example storage cards. Specifically, the exploded view, referenced herein as parts diagram 400, illustrates example parts that are utilized to configure modified connector component 304. Parts diagram 400 includes primary SIM card 402, metal insert 404, tray 406, rubber insert 410, housing door 412, secondary SIM card 414, and non-volatile memory card 416. Parts diagram 400 further includes, housing shell A 418, adhesive flex layer A 420, primary SIM contact 422, push bar 424, tray ejector 426, plunger 428, secondary SIM contact 430, non-volatile memory card contact 432, pivot point 434, board-to-board contact 436, housing shell support 438, adhesive flex layer B 440, and housing shell B 442.

Primary SIM card 402, secondary SIM card 414, and non-volatile memory card 416 are examples of a plurality of data storage cards that can be concurrently inserted into modified connector component 304. In response to insertion of primary SIM card 402, secondary SIM card 414, and non-volatile memory card 416 into modified connector component 304, the inserted data storage cards are configured to enable electronical transfer of respective electronic data to processor 105 (FIG. 1) and/or to receive and store data received from processor 105.

More specifically, tray 406 has the capacity to hold at least three different forms of data storage cards for concurrent insertion into a cavity of modified connector component 304. Metal insert 404 is utilized within tray 406 to minimize electrical interference between at least two different forms of data storage cards during concurrent insertion of at least two different forms of data storage cards into the cavity of modified connector component 304. Tray 406 includes a tray opening for receiving each of primary SIM card 402, secondary SIM card 414, and non-volatile memory card 416. Tray 406 also includes a plurality of openings for exposing the corresponding electrical contact on each inserted data storage card to a corresponding contact from among the plurality of contacts, for example primary SIM contact 422, secondary SIM contact 430, and non-volatile memory card contact 432. Further, rubber insert 410 is a removeable rubber insert that seals the tray opening. A removeable housing door, housing door 412, is utilized to seal an opening to modified connector component 304.

Push bar 424, tray ejector 426, and plunger 428 form an ejection assembly that facilitates dislodging an inserted data storage card inserted within tray 406. Pivot point 434 is an axis point formed as part of at least one connector, and in particular, non-volatile memory card contact 432.

In one embodiment, housing door 412, is a smooth uninterrupted surface that does not include a pin hole. The configuration in which housing door 412 does not have a pin hole is advantageous for increased waterproofing of mobile device 100. Instead of a pin hole, which would allow water to seep into mobile device 100, plunger 428 is pressed to engage the tray ejection assembly, as further discussed in the description of FIG. 10. In another embodiment, housing door 412 has a partial pin hole. The partial pin hole is sealed, thereby enabling a pin to be inserted. The perforation or pin hole is sealed at one end so that water cannot seep into mobile device 100. In response to a pin or tool providing force and pressing housing door 412, the force engages plunger 428 and push bar 424 thereby enabling tray assembly to actuate.

The housing structure of connector component 304 includes housing shell A 418, housing shell B 442, adhesive flex layer A 420, adhesive flex layer B 440, and housing shell support 438. Housing shell A 418 and housing shell B 442 are the outside metal surfaces of connector component 304. Housing shell A 418 has an insert that is dimensioned to hold tray 406. Housing shell support 438 is formed using a flexible printed circuit board, and has a flexible bilateral surface. Adhesive flex layer A 420 and adhesive flex layer B 440 are utilized to couple housing shell A 418 and housing shell B 442 to housing shell support 438. Adhesive flex layer A 420 and adhesive flex layer B 440 is a conductive adhesive, in one embodiment. In another embodiment, adhesive flex layer A 420 and adhesive flex layer B 440 are non-conductive adhesives. The thicknesses of adhesive flex layer A 420 and adhesive flex layer B 440 are selected to minimize the spatial area of the housing structure within mobile device 100. For example, the thickness of adhesive flex layer A 420 and adhesive flex layer B 440 can each be 0.050-millimeters (mm). Housing shell A 418 and housing shell B 442 each have at least one perforation that respectively align to at least one corresponding perforation associated with housing shell support 438 to configure, in part, the housing structure of connector component 304.

Primary SIM contact 422, secondary SIM contact 430, non-volatile memory card contact 432, and board-to-board contact 436 are a plurality of contacts coupled to the exposed surface of housing shell support 438 and are positioned to respectively interconnect and form an electrical connection with corresponding electrical contacts on each data storage card of the at least three different forms of data storage cards (e.g. primary SIM card 402, secondary SIM card 414, and non-volatile memory card 416) that are selectively positioned and concurrently inserted in tray 406. Board-to-board contact 436 is communicatively coupled to each of the plurality of contacts. Board-to-board contact 436 enables transmission of signals between processor 105 and the plurality of data storage cards.

Figure 5:
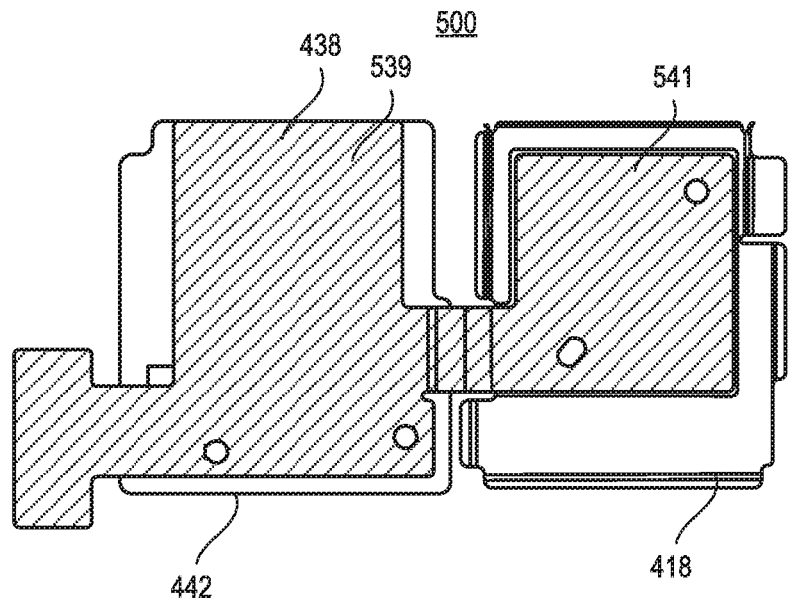
FIG. 5 illustrates an example view of a partially assembled modified connector component housing structure, in accordance with one or more embodiments.

Referring now to FIG. 5, which illustrates an example view of a partially assembled modified connector component 304. Housing structure 500 includes housing shell A 418, housing shell B 442, and housing shell support 438. Housing shell A 418, housing shell B 442, and housing shell support 438 each have at least one perforation that respectively align to configure modified connector component 304, in part. Successful alignment of the perforations enables the first side of the flexible bilateral surface of housing shell support 438 to accurately adhere to an inside surface of housing shell A 418 and housing shell B 442, respectively, via adhesive flex layer A 420 and adhesive flex layer B 440, which form first contact surface 539 and adjacent contact surface 541.

Figure 6:
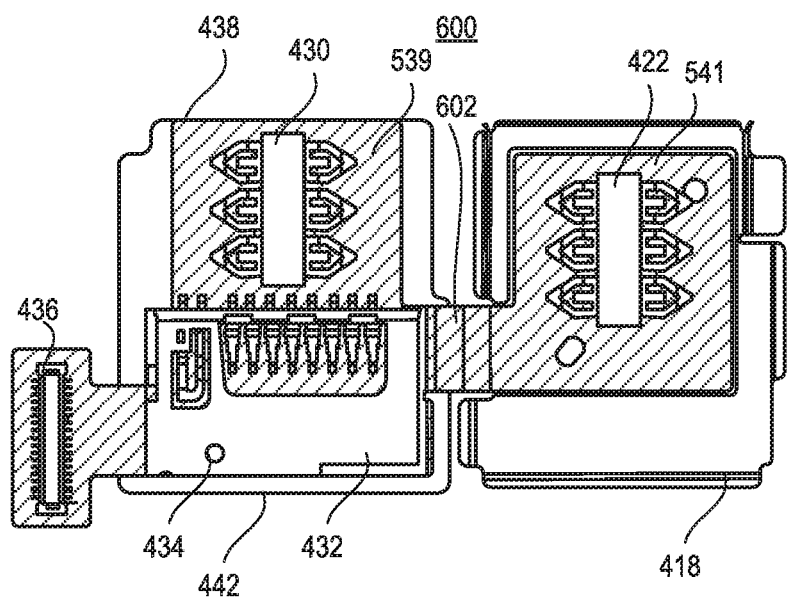
FIG. 6 illustrates an example configuration of contacts positioned within the modified connector component housing structure of FIG. 5, according to one or more embodiments.

FIG. 6 illustrates an example configuration of contacts coupled to the exposed surface of housing shell support 438 within modified connector component 304. Contacts assembly 600 includes housing shell A 418, primary SIM contact 422, secondary SIM contact 430, non-volatile memory card contact 432, pivot point 434, board-to-board contact 436, housing shell support 438, housing shell B 442, and hinge 602. Primary SIM contact 422, secondary SIM contact 430, and non-volatile memory card contact 432 are a plurality of contacts that couple to an exposed surface of housing shell support 438. The plurality of contacts is positioned to connect to each inserted data storage card. Primary SIM contact 422, secondary SIM contact 430, and non-volatile memory card contact 432 each respectively interconnect with a corresponding electrical contact on each inserted data storage card for respectively electronically transferring electronic data from primary SIM contact 422, secondary SIM contact 430, and non-volatile memory card contact 432 to processor 105. In one embodiment, non-volatile memory card contact 432 is formed with pivot point 434. Pivot point 434 is utilized as a spindle for rotating tray ejector 426 when receiving and/or ejecting tray 406.

Figure 7:
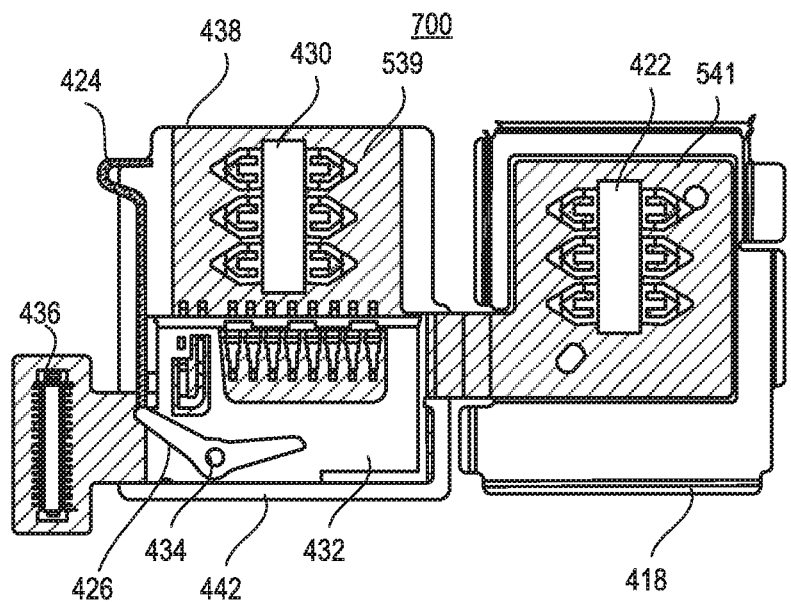
FIG. 7 illustrates one view of the example configuration of contacts of FIG. 6 and an ejection assembly within the modified connector component housing structure, in accordance with one or more embodiments.

Referring now to FIG. 7, which illustrates an example of connector component 304 with an ejection assembly. Ejector assembly 700 includes housing shell A 418, primary SIM contact 422, push bar 424, tray ejector 426, secondary SIM contact 430, non-volatile memory card contact 432, pivot point 434, board-to-board contact 436, housing shell support 438, and housing shell B 442. Push bar 424 and tray ejector 426 form a part of ejection assembly 700. Tray ejector 426 has a perforation. The perforation of tray ejector 426 is fit around pivot point 434. Tray ejector 426 is able to pivot around pivot point 434 in response to a force received at push bar 424. The assembly of tray ejector 426 and pivot point 434 facilitates a rotational movement of tray ejector 426. The angle of rotation is proportional to the distance needed to eject tray 406 from the cavity of connector component 304. In response to the force received at push bar 424, the plurality of contacts responsively disconnects from the corresponding electrical contact on an inserted data storage card.

Figure 8:
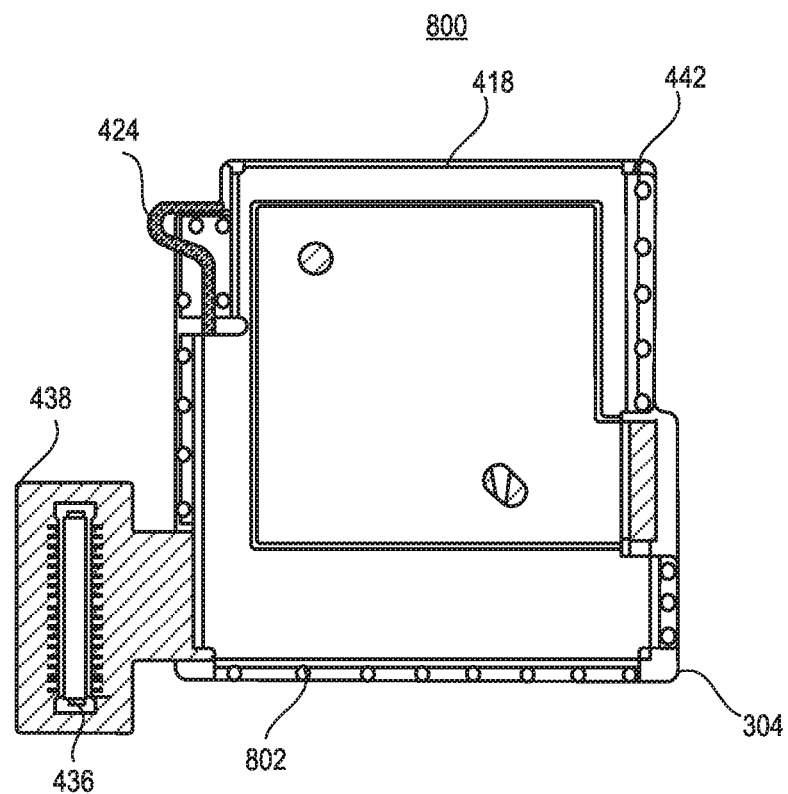
FIG. 8 illustrates an example view of a welded modified connector component, according to one or more embodiments.

FIG. 8 illustrates an example view of a welded modified connector component. Welded connector component 800 includes housing shell A 418, push bar 424, housing shell support 438, board-to-board contact 436, housing shell B 442, and weld point 802. Housing shell support 438 bends at hinge 602 (FIG. 6), to establish a discernable first contact surface 539 and an adjacent contact surface 541. The plurality of contacts is selectively positioned on the first contact surface and at least one contact is positioned on the adjacent contact surface. Applying a bending force to housing shell support 438 encloses the plurality of contacts and exposes the outer surface of housing shell A 418 and housing shell B 442. Select areas of a perimeter edge of housing shell A 418 and housing shell B 442 are welded together to form the cavity for receiving tray 406. Push bar 424 remains positioned near the folded edge of housing shell support 438 in preparation to engage tray ejector 426 in response to receiving a force. Board-to-board contact 436 is a contact that is utilized to couple to a corresponding contact and/or electronic component within mobile device 100. Therefore, board-to-board contact 436 is external to the cavity of modified connector component 304.

Figure 9:
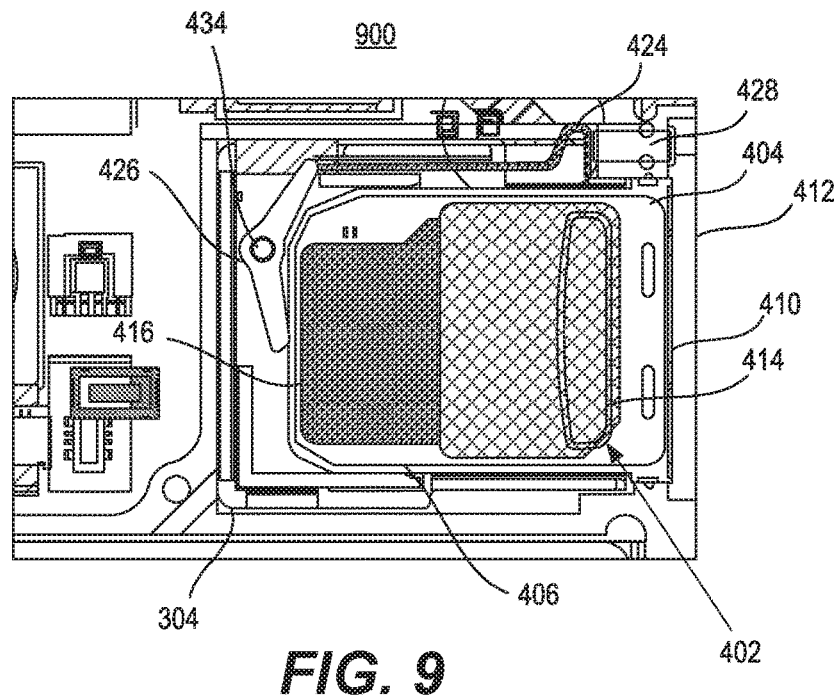
FIG. 9 illustrates a top down view of a tray having a plurality of data storage cards inserted in the modified connector component, according to one or more embodiments.

FIG. 9 provides a top down view of a tray that has a plurality of data storage cards inserted therein. In this example depiction of connector component 304, the housing shell (housing shell A 418 and housing shell B 442) and housing shell support 438 are not explicitly visible so that the internal parts of connector component 304 are viewable. Tray assembly 900 includes primary SIM card 402, metal insert 404, tray 406, rubber insert 410, housing door 412, secondary SIM card 414, and non-volatile memory card 416. Tray assembly 900 further includes push bar 424, tray ejector 426, plunger 428, and pivot point 434.

In operation, primary SIM card 402, metal insert 404, secondary SIM card 414, and non-volatile memory card 416 are selectively positioned within tray 406. Tray 406 has a capacity to hold at least three different forms of data storage cards for concurrent insertion into a cavity of connector 304. The plurality of contacts, primary SIM contact 422, secondary SIM contact 430, and non-volatile memory card contact 432 depicted on the exposed surface of housing shell support 438 are positioned to respectively interconnect and form an electrical connection with corresponding electrical contacts on a corresponding data storage card from among the at least three different forms of data storage cards that are selectively positioned and concurrently inserted in tray 406. For example, primary SIM card 402, secondary SIM card 414, and non-volatile memory card 416 are respectively coupled, for data exchange, to primary SIM contact 422, secondary SIM contacts 430, and non-volatile storage card contact 432 positioned on the exposed surface of housing shell support 438.

Connector component 304 receives tray 406 with the plurality of inserted data storage cards. In response to a force from the insertion of tray with data storage cards, housing shell support 438 and adhesive flex layer A 420 and adhesive flex layer 440 temporarily recoil, thereby decreasing an area between the housing shell (housing shell A 418 and housing shell B 442) and housing shell support 438. The capability of the housing shell and housing shell support 438 to recoil is advantageous for enabling multiple forms of data storage cards to be utilized within mobile device 100 (FIG. 1) concurrently. In an example embodiment, the modified dimensions of connector component 304 are 20.20 mm length, 17.90 mm width, and 3.34 mm depth, which is more compact in at least one dimension than existing SIM connector assemblies such as SIM connector assembly 204. In addition to the ability to concurrently insert a plurality of data storage cards, the modified dimensions of connector component 304 also enable the uninhibited placement of radio frequency imaging sensor 159, uninterrupted positioning of a radio frequency emitter, and uninhibited positional placement of a top antenna contact within mobile device 100.

Figure 10:
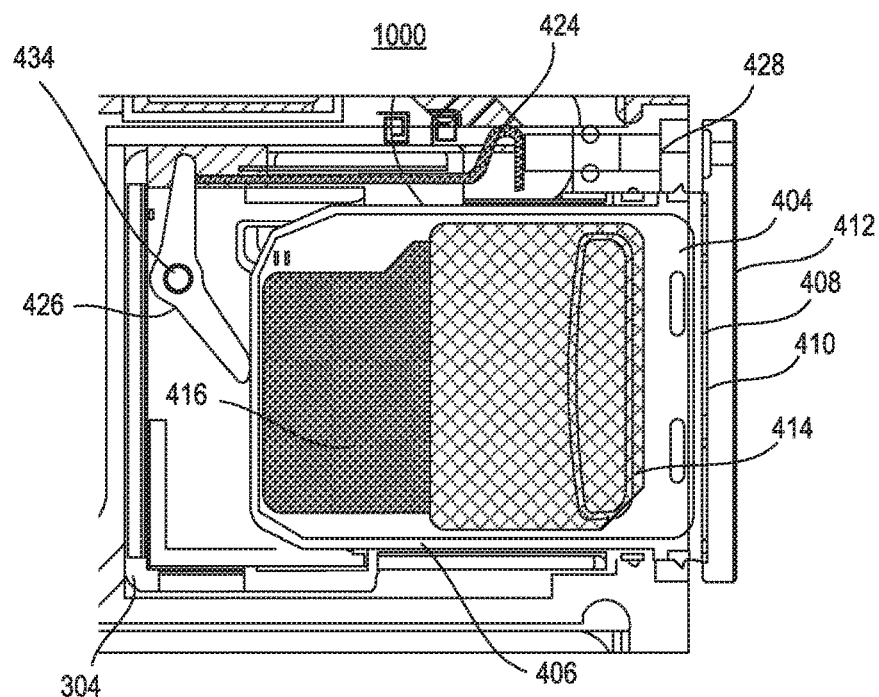
FIG. 10 illustrates an example of an ejection assembly engaged to eject the tray within the modified connector component, in accordance with one or more embodiments.

Now turning to FIG. 10, there is illustrated a mechanical configuration 1000 by which tray ejector 426 dislodges tray 406 from component connector 304. Mechanical configuration 1000 includes primary SIM card 402, metal insert 404, tray 406, rubber insert 410, housing door 412, secondary SIM card 414, and non-volatile memory card 416. Mechanical configuration 1000 further includes, push bar 424, tray ejector 426, plunger 428, and pivot point 434.

In operation, push bar 424, tray ejector 426, plunger 428, and pivot point 434 form an ejection assembly that facilitates dislodging the inserted data storage card. For example, primary SIM card 402, secondary SIM card 414, and non-volatile memory card 416, which are inserted within tray 406 are concurrently ejected (i.e., made accessible for removal) with the ejection of tray 406. In response to a received force at housing door 412, plunger 428 is engaged and moves along a single axis to depress push bar 424. Plunger 428 encounters push bar 424, enabling tray ejector 426 to pivot around pivot point 434, in response to the force received at push bar 424. Thereby, tray 406 dislodges from connector component 304. The plurality of contacts responsively disconnects from the corresponding electrical contact on an inserted data storage card.

Figure 11:
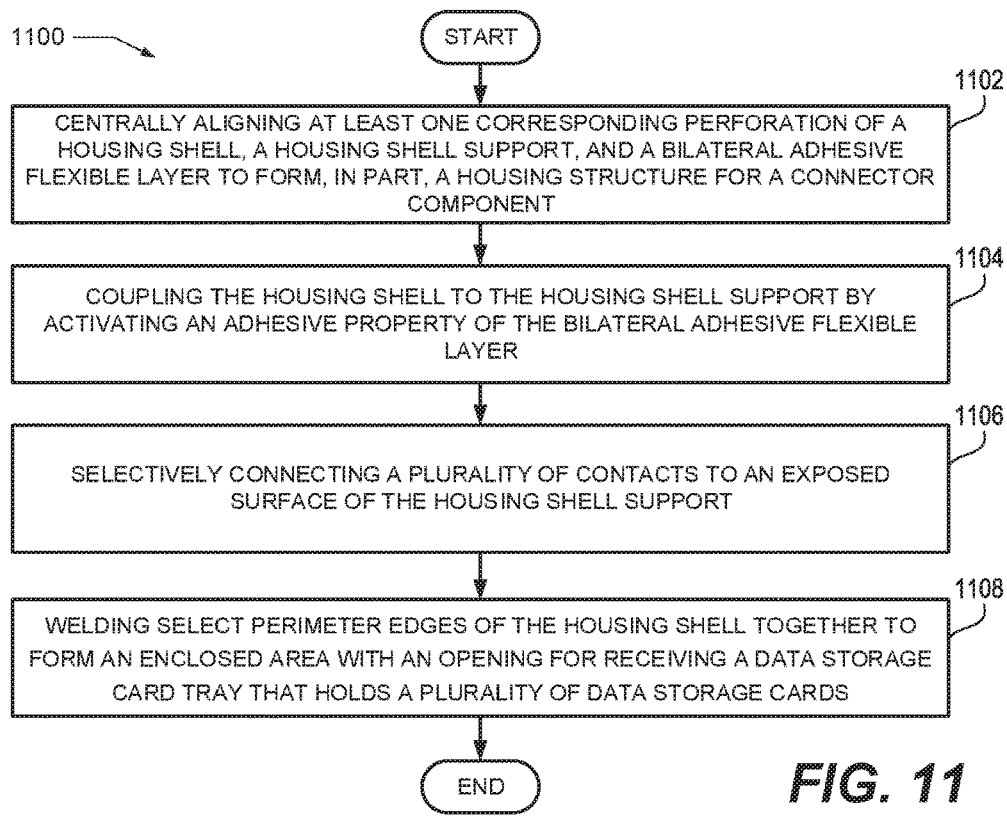
FIG. 11 illustrates a method for manufacturing the modified connector component, according to one or more embodiments of this disclosure.
Figure 12:
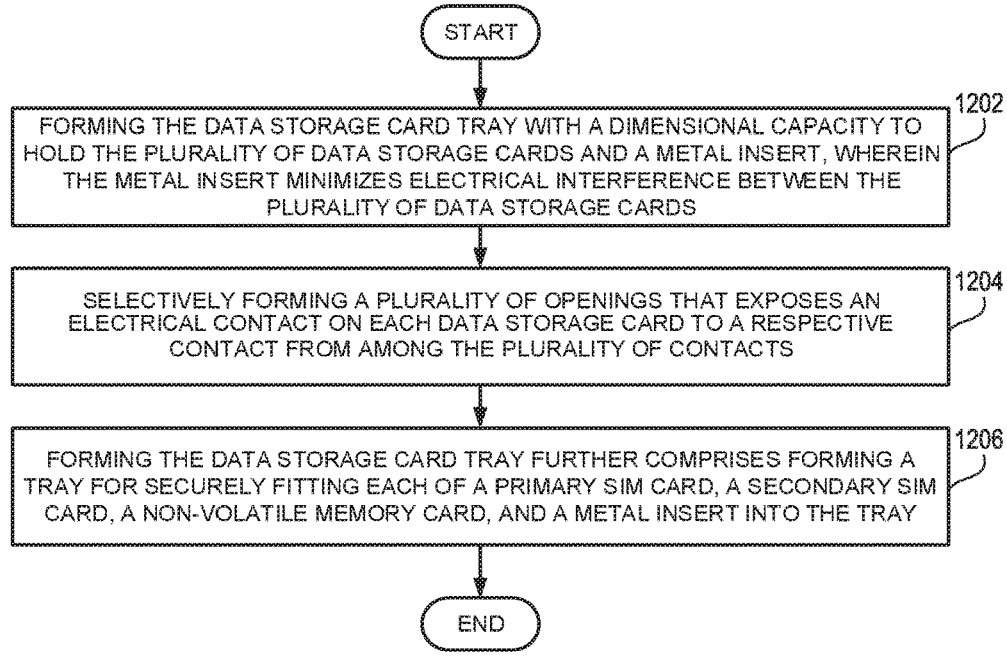
FIG. 12 illustrates a method for manufacturing a data storage card tray of the modified connector component, according to one or more embodiments of this disclosure.

Referring now to FIG. 11 and FIG. 12. FIG. 11 provides a method of manufacturing a modified connector component. FIG. 12 provides a method of manufacturing a data storage card tray to concurrently hold a plurality of data storage cards, for insertion into the modified connector component. The methods are implemented by a manufacturer and/or a manufacturing tool/device/system having a processor and installed computer program product with program code that enables the completion of an automated, computer-implemented process described by the methods. Aspects of the methods are described with reference to the components of FIG. 1 and FIGS. 3-10.

Method 1100 commences at the start block, then proceeds to block 1102. At block 1102, a manufacturing system centrally aligns at least one corresponding perforation of a housing shell (housing shell A 418 and housing shell B 442), housing shell support 438, and a bilateral adhesive flexible layer (adhesive layer A 420 and adhesive flex layer 440) to form, in part, a housing structure for connector component 304. The manufacturing system couples the housing shell to housing shell support 438 by activating an adhesive property of the bilateral adhesive flexible layer, at block 1104. At block 1106, the manufacturing system selectively connects a plurality of contacts to an exposed surface of the housing shell support. The manufacturing system welds select perimeter edges of the housing shell together, at block 1108, to form an enclosed area with an opening for receiving a data storage card tray, e.g., tray 406, that holds a plurality of data storage cards. The process of manufacturing the modified component connector enables each of the plurality of contacts to be accessible to connect to a corresponding electrical contact on an inserted data storage card from among the plurality of data storage cards. Method 1100 concludes at the end block.

Method 1200 commences at start block, then proceeds to block 1202. At block 1202 the component tray manufacturing system forms the data storage card tray with a dimensional capacity to hold the plurality of data storage cards and a metal insert. At block 1204, the manufacturer selectively forms a plurality of openings that exposes an electrical contact on each data storage card to a respective contact from among the plurality of contacts presented by a modified component connector, such as modified connector component 304. At block 1206, the manufacturer forms a data storage card tray for securely fitting each of primary SIM card 402, secondary SIM card 414, non-volatile memory card 416, and metal insert into the tray 406.

In the above-described flow charts, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A connector comprising:
a housing shell;
a housing shell support having a flexible bilateral surface with a first side that is coupled to the housing shell using an adhesive layer that, in response to a force from an inserted data storage card, temporarily recoils, decreasing an area between the housing shell and the housing shell support;
a plurality of contacts coupled to an exposed surface of the housing shell support that interconnects with a corresponding electrical contact on each inserted data storage card for electronically transferring electronic data; and
a tray that has a capacity to hold a plurality of data storage cards for a concurrent insertion into a cavity, of the connector, formed by the housing shell.

2. The connector of claim 1, further comprising:
an ejection assembly that facilitates dislodging an inserted data storage card inserted within the tray and that comprises:
a push bar;
a plunger that moves along a single axis to depress the push bar in response to a received force; and
a tray ejector that comes in contact with the push bar to facilitate disjoining a connection between the plurality of contacts and the corresponding electrical contact on the inserted data storage card, wherein the tray ejector rotates on a pivot point.

3. The connector of claim 1, wherein the plurality of contacts on the exposed surface of the housing shell support are positioned to respectively interconnect and form an electrical connection with corresponding electrical contacts on each data storage card of the plurality of data storage cards that are selectively positioned and concurrently inserted in the tray.

4. The connector of claim 1, wherein the housing shell has an inset that is dimensioned to hold the tray.

5. The connector of claim 1, wherein the housing shell and the housing shell support each have at least one perforation that respectively align to configure the connector, in part.

6. The connector of claim 1, wherein select areas of a perimeter edge of the housing shell are welded together to form the cavity for receiving the tray.

7. The connector of claim 1, wherein the plurality of contacts comprises at least three of:
a primary Subscriber Identity Module (SIM) card contact;
a secondary SIM card contact;
a non-volatile memory card contact; and
a board-to-board contact.

8. The connector of claim 1, wherein the tray further comprises:
a tray opening for receiving each data storage card and a metal insert, wherein the metal insert minimizes electrical interference between at least two different forms of data storage cards during concurrent insertion of the at least two different forms of data storage cards into the cavity of the connector;
a plurality of openings for exposing the corresponding electrical contact on each inserted data storage card to a corresponding contact from among the plurality of contacts;
a removeable rubber insert that seals the tray opening; and
a removeable housing door that seals an opening to the connector.

9. The connector of claim 1, wherein the tray has a dimensional capacity to concurrently hold at least a primary SIM card, a secondary SIM card, a non-volatile memory card, and a metal insert.

10. An electronic device comprising:
a processor;
a system interconnect coupled to the processor; and
an input/output controller coupled to the system interconnect and to a connector component that comprises:
a housing shell;
a housing shell support having a flexible bilateral surface with a first side that is coupled to the housing shell using an adhesive layer that, in response to a force from each inserted data storage card, temporarily recoils, decreasing an area between the housing shell and the housing shell support;
a plurality of contacts, for connecting to a corresponding electrical contact on an inserted data storage card, is coupled to an exposed surface of the housing shell support, wherein the plurality of contacts is positioned to contact each inserted data storage card and respectively form an electrical connection with each inserted data storage card; and
a tray, for inserting into a cavity of the housing shell, that has a dimensional capacity to concurrently hold at least three different forms of data storage cards, wherein select areas of a perimeter edge of the housing shell are welded together to form an enclosed area with an opening for receiving the tray.

11. The electronic device of claim 10, wherein the connector component further comprises:
an ejection assembly that facilitates dislodging an inserted data storage card inserted within the tray and that comprises:
a push bar;
a plunger that moves along a single axis to depress the push bar in response to a received force; and
a tray ejector that comes in contact with the push bar to facilitate disjoining a connection between the plurality of contacts and the corresponding electrical contact on the inserted data storage card, wherein the tray ejector rotates on a pivot point.

12. The electronic device of claim 10, wherein the connector component further comprises:
a tray opening for receiving each data storage card and a metal insert, wherein the metal insert minimizes electrical interference between at least two different forms of data storage cards during a concurrent insertion of the at least three different forms of data storage cards into the cavity of the connector component;
a plurality of openings for exposing each of the at least three different forms of data storage cards to a respective contact from among the plurality of contacts that is selectively positioned on the exposed surface of the housing shell support, wherein the plurality of contacts is at least a primary Subscriber Identity Module (SIM) card contact, a secondary SIM card contact, and a non-volatile memory card contact;
a removeable rubber insert that seals the tray opening; and
a removeable housing door that seals an opening to the connector component.

13. The electronic device of claim 10, wherein the connector component has a dimensional capacity to concurrently hold a primary SIM card, a secondary SIM card, a non-volatile memory card, and a metal insert.

14. A method comprising:
centrally aligning at least one corresponding perforation of a housing shell, a housing shell support, and a bilateral adhesive flexible layer to form, in part, a housing structure for a connector component;
coupling the housing shell to the housing shell support by activating an adhesive property of the bilateral adhesive flexible layer;
selectively connecting a plurality of contacts to an exposed surface of the housing shell support; and
welding select perimeter edges of the housing shell together to form an enclosed area with an opening for receiving a data storage card tray that holds a plurality of data storage cards, wherein each of the plurality of contacts are accessible to connect to a corresponding electrical contact on an inserted data storage card from among the plurality of data storage cards.

15. The method of claim 14, further comprising bending the housing shell support, at a hinge, to establish a first contact surface and an adjacent contact surface, wherein the plurality of contacts is selectively positioned on the first contact surface and at least one contact is positioned on the adjacent contact surface.

16. The method of claim 14, further comprising:
forming a pivot point as part of at least one connector; and
fitting a tray ejector around the pivot point, wherein the tray ejector is able to pivot around the pivot point in response to a force received at a push bar, wherein the plurality of contacts responsively disconnects from the corresponding electrical contact on an inserted data storage card.

17. The method of claim 14, wherein the housing shell support is formed using a flexible printed circuit board.

18. The method of claim 14, wherein the plurality of contacts comprises at least three of:
a primary Subscriber Identity Module (SIM) card contact;
a secondary SIM card contact;
a non-volatile memory card contact; and
a board-to-board contact.

19. The method of claim 14, further comprising forming the tray by:
forming the data storage card tray with a dimensional capacity to hold the plurality of data storage cards and a metal insert, wherein the metal insert minimizes electrical interference between the plurality of data storage cards;
selectively forming a plurality of openings that exposes an electrical contact on each data storage card to a respective contact from among the plurality of contacts; and
forming a tray mold for securely fitting each of a primary SIM card, a secondary SIM card, a non-volatile memory card, and a metal insert into the tray.

20. The method of claim 14, further comprising forming the tray by:
engaging, at an opening to the data storage card tray, a removeable rubber insert that seals the opening to the data storage card tray; and
fastening a removeable housing door over the removeable rubber insert that seals the opening for receiving the data storage card tray.

* * * * *